United States Patent
Bhakuni et al.

[15] 3,661,623
[45] May 9, 1972

[54] HEAT STABLE POLYESTER CORD REINFORCED RUBBER STRUCTURE AND METHOD OF MAKING

[72] Inventors: Roop S. Bhakuni; John G. Morgan; Terry F. Allen, all of Akron, Ohio

[73] Assignee: The Goodyear Tire & Rubber Company, Akron, Ohio

[22] Filed: Oct. 3, 1969

[21] Appl. No.: 863,698

[52] U.S. Cl..................117/76 T, 117/80, 117/138.8 F, 156/110 A, 156/330, 156/335
[51] Int. Cl. ................................B32b 25/02, B32b 27/36
[58] Field of Search.........................117/76 T, 80, 138.8 F; 156/110 A, 330, 335

[56] References Cited

UNITED STATES PATENTS

| | | | |
|---|---|---|---|
| 2,902,398 | 9/1959 | Schroeder | 117/76 T X |
| 3,108,010 | 10/1963 | Nakane et al. | 117/76 T X |
| 3,222,238 | 12/1965 | Krysiak | 117/76 T |
| 3,231,412 | 1/1966 | Pruitt et al. | 117/80 X |
| 3,247,043 | 4/1966 | Cardina | 117/138.8 F X |
| 3,268,467 | 8/1966 | Rye et al. | 117/138.8 F X |
| 3,285,798 | 11/1966 | Tesoro | 156/110 A |
| 3,419,452 | 12/1968 | Krysiak | 117/138.8 F X |

Primary Examiner—William D. Martin
Assistant Examiner—Ralph Husack
Attorney—F. W. Brunner and V. G. Parker

[57] ABSTRACT

A method of making a heat stable polyester cord reinforced rubber structure, such as a tire, and the resultant structure, which method comprises applying an adhesive to the polyester cord and depositing in the vicinity of the adhesive a heat stabilizing agent selected from a tris substituted-aziridinyl phosphine oxide or sulfide, a polycarbodiimide, bis(tri-n-butyltin) oxide and a hindered phenol.

13 Claims, No Drawings

HEAT STABLE POLYESTER CORD REINFORCED RUBBER STRUCTURE AND METHOD OF MAKING

This invention relates to a heat stable rubber structure reinforced with polyester reinforcing cord and more particularly to a structure in which the rubber to cord adhesive bond is stabilized against degradation at elevated temperatures.

Pneumatic tires are being subjected to increasingly severe operating conditions including high speeds and heavy loads which results in the generation of higher temperatures in the tire. Rubber used in the tire is reinforced with such materials as rayon, nylon, polyester, wire, and glass cords. Maximum reinforcement of the rubber is obtained with a given cord when maximum adhesion is produced between the rubber and the cord. Polyethylene terephthalate tire cords are particularly desirable to use as reinforcing elements because of their excellent dimensional stability as shown by low growth or stretch during service. However, it has been observed that in the environment of the complex chemical composition of the rubber of a pneumatic tire and of the reinforcing cord as well as of the adhesive, the heat generated under severe running conditions causes the adhesive bond to degenerate and ultimately reduce the tensile strength of the polyester cord.

It has now been discovered that the tensile strength of the polyester cord and the cord to rubber adhesive bond both can be greatly stabilized against degradation under these conditions by introducing a stabilizing amount (0.025 to 5 parts per 100 parts of adhesive) of a heat stabilizer into the vicinity of the adhesive bond. For example, the stabilizer can be added to the first or second dip of a two-dip adhesive system or to the surface of the reinforcing cord or in the spin finish applied to the cord during the fiber forming operation.

Adhesive bond stabilizers useful in the present invention are the tris substituted-aziridinyl phosphine oxides having the general formula

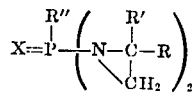

wherein X is oxygen or sulfur, R is an alkyl radical of (1 to 100) or an aryl radical and R' is hydrogen or an alkyl radical (1 to 10C) and R'' is

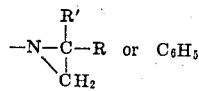

A phosphine oxide that may be used is tris-[1-(2-methyl) aziridinyl] phosphine oxide, and di[1-(2-methyl) aziridinyl]-1-phenyl phosphine oxide. Other suitable stabilizers are the tris-[1-(2-methyl) aziridinyl] phosphine sulfides, the polycarbodiimides having the general formula

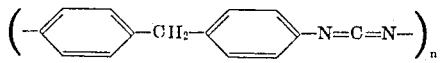

wherein $n$ is less than 10 and as made, for example, as disclosed in German Pat. No. 924,751 (2-3-55), bis(tri-n-butyltin) oxide, and hindered phenolic phosphorous compounds of the formula

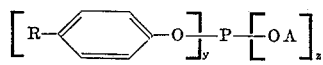

in which R is a hydrocarbon radical containing from four to 10 carbon atoms, P represents the phosphorous atom, and $y$ and $z$ are integers selected from 1 and 2 and the sum of $y$ plus $z$ equals 3 and A is selected from the group consisting of

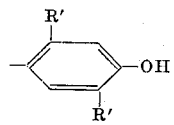

and

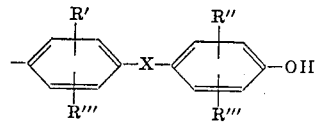

wherein R' and R'' are selected from the group consisting of the same and different tertiary alkyl radicals containing from four to eight carbon atoms, R''' is selected from hydrogen and alkyl radicals containing from two to 10 carbon atoms and X is a saturated aliphatic divalent radical containing from one to four carbon atoms.

These stabilizers have particular value in adhesive systems as disclosed, for example, in Cardina U.S. Pat. No. 3,247,043 using an epoxy resin as a bond producing ingredient in the first dip used alone or in combination with an R/F/L second dip. Epoxy resins are especially desirable in producing rubber to cord adhesion but present difficulties at high temperatures which the present invention now solves. These stabilizers also have value in adhesive systems using a blocked isocyanate as disclosed, for example, in Rye et al. U.S. Pat. No. 3,268,467. These stabilizers are used in stabilizing amounts and may be used in amounts from 0.025 to 5 parts and preferably from 0.1 to 2.5 parts per 100 parts of adhesive composition.

The polyester used as the reinforcing element is any fiber forming thermoplastic linear high molecular weight condensation polyester, and particularly polyethylene terephthalate as well as polymers of cyclohexanedimethylene terephthalate. These polyesters as well as copolyesters of aromatic dicarboxylic acids and particularly condensation products of ethylene glycol with a mixture of terephthalic acid and isophthalic acid, ethylene glycol with terephthalic acid and another dibasic acid such as sebasic or adipic acid or hydroxycarboxylic acid such as parahydroxy benzoic acid present in small amounts and polyesters of terephthalic acid with glycol 1,4 bis (hydroxymethyl) cyclohexane. By linear terephthalic polyesters is meant a linear condensation polyester comprising recurring glycol dicarboxylate structural units in which at least about 85 percent of the recurring structural units are units of the formula -O-G-OOC-CO- wherein G represents a divalent organic radical containing from about two to about eight carbon atoms which is attached to the adjacent oxygen atoms by saturated carbon atoms. The terephthalate radical may be the sole dicarboxylate constituent of the recurring structural units or up to about 15 percent of the structural units may contain other dicarboxylate radicals such as adipate, sebacate, isophthalate, 4,4' dibenzoate and hexahydroterephthalate. By high molecular weight is meant polyesters having an intrinsic viscosity of at least 0.4 and preferably greater than 0.6 and as high as 1.5 as measured in a 60/40 phenol/tetrachlorethane mixed solvent at 30° C. It is preferred that the polyethylene terephthalate and other similar polyesters have a high melting point which for polyethylene terephthalate is about 265° C. measured with a hot stage polarizing microscope. The polyester fibers may be prepared in accordance with well-known procedures for melt extrusion and drafting.

The rubber being reinforced is compounded in accordance with the following formulation.

Rubber (MRS)

| Ingredients | Parts by Weight Amount Used | May be Used |
|---|---|---|
| 1. Natural Rubber | 70 | 0–100 |
| 2. OE/SBR 1778 (styrene/butadiene-1,3 23.5/76.5 copolymer) (plus 37½ parts oil per 100 SBR | 27.5 | 100–0 |
| 3. Cis 1,4-polybutadiene | 10 | 0–50 |
| 4. Carbon Black (Reinforcing agent) | 40 | 25–100 |
| 5. Zinc Oxide (Activator of cure) | 4 | 2–10 |
| 6. Stearic Acid (Activator of cure) | 2 | 1.5–3.0 |
| 7. Primary Accelerator (2,2'-dithio-bisbenzothiazole) | 1.25 | .5–3.0 |
| 8. Pine Oil (Softener) | 10 | 2–50 |

| | | |
|---|---|---|
| 9. Secondary Accelerator (Tetramethyl- thiuram disulfide) | .10 | .05-1.0 |
| 10. Antioxidant | .60 | .1-4 |
| 11. Sulfur (Vulcanizing agent) | 2.5 | 1.0-5.0 |

In compounding the rubber stock in accordance with the formulation set forth above, a masterbatch of ingredients 1 and 2 are made with the carbon black and mixed on a mill to a temperature of about 110° C. and may be mixed at a temperature as high as 140° C. The resulting carbon black masterbatch is then cooled and the remaining compounds are mixed into the batch in the order indicated above to a temperature of about 70° C. and may be mixed at a temperature as high as 100° C.

The treated cord is then imbedded in this rubber (conveniently referred to as MRS) and cured at 310° F. at 50 psi and then aged 2½ hours at 350° F. The cord tensile strength is expressed on a rating of 100 for the control in which no stabilizer is used.

The following examples describe the best manner in which stabilization of the polyester cord and of the adhesive bond is obtained when using adhesive systems hereinafter disclosed. All parts are by weight unless otherwise indicated.

EXAMPLE 1

(Stabilizer added to blocking resin)

To 66.8 parts of a formaldehyde blocking agent (resin A) made in accordance with example 1 of Rye et al. U.S. Pat. No. 3,268,467 was added varying amounts (as shown in table I) of a hindered phenolic phosphorous compound of the type shown above and specifically being

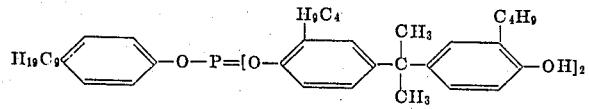

and conveniently referred to as HPP. The resulting mixture was then added to 20.2 parts of (PAPI) polymethylene polyphenyl isocyanate to form a blocked polyisocyanate (resin B) in accordance with the procedure shown in example 2 of Rye et al. U.S. Pat. No. 3,268,467.

An adhesive dip was made by adding 25 parts of resin B containing the phenolic stabilizer to 75 parts of a conventional (R/F/L) resorcinol/formaldehyde/rubber latex adhesive composition made in accordance with the following formula:

R/F/L ADHESIVE

| Ingredients | Parts |
|---|---|
| Resorcinol | 2.03 |
| Formaldehyde (37%) | 2.62 |
| Sodium Hydroxide (10%) | 2.00 |
| Terpolymer rubber latex of styrene/butadiene/vinylpyridine, 15/70/15 (41%) | 14.20 |
| Copolymer rubber latex of styrene/butadiene (39%) | 27.40 |
| Water | 51.75 |

The adhesive compositions that may be used as the second dip in combination with the epoxy resin stabilizer first dip for the polyester cord are those adhesive compositions comprising an aqueous dispersion of a rubbery hydrocarbon polymer and a phenol/aldehyde heat convertible resole. The rubber polymer may be any diene type of rubbery polymer as, for example, copolymers resulting from the polymerization of a conjugated diene and vinylpyridine, or a vinyl aromatic monomer, such as styrene.

The phenol/aldehyde heat convertible resole is the condensation product of an aldehyde with a phenol which under the influence of heat becomes permanently infusible. Examples of phenols include halogen or alkyl substituted phenols such as chlorophenols, tertiary butyl phenol and tertiary amyl phenol and polyhydric phenols, including resorcinol, catechol, phloroglucinol, orcinol and hydroquinone. Formaldehyde is the preferred aldehyde for forming the resoles. Other aldehydes and aldehyde-producing agents that may be used include paraformaldehyde, hexamethylenetetramine, acetaldehyde, butyraldehyde, chloral, furfural and salicylaldehyde. The phenol/aldehyde resin is preferably used in combination with a synthetic or natural rubber latex; the rubber-to-resin ratio may range from 6:1 to 2:1 parts by weight.

A reinforcing element comprising a polyester cord 1300/3 (Dacron) was treated with the six different adhesive compositions shown below in table I (each adhesive composition being the same except for the amount of stabilizer added) by passing the cord through the particular adhesive at such a rate as to deposit on the surface of the cord about 5 percent adhesive solids. The dipped cords are then dried at 450° F. for 2 minutes and imbedded in rubber (MRS) compounded as shown above and tested for peel adhesion in terms of force necessary to pull the rubber away from the cords and amount of rubber left covering the cords, and aging.

TABLE I

| Sample | 1 | 2 | 3 | 4 | 5 | 6 |
|---|---|---|---|---|---|---|
| Stabilizer (HPP), parts | 0.0 (control) | 0.30 | 1.0 | 1.5 | 2.0 | 3.0 |
| Peel Adhesion:[1] Cure 10' at 340° F,— | | | | | | |
| Force rating (A) | 100 | 123 | 104 | 102 | 122 | 104 |
| Rubber coverage rating (B) | 100 | 193 | 150 | 133 | 230 | 117 |
| Compound aging [2] | 100 | 115 | 109 | 112 | 112 | 111 |

1. Peel adhesion is determined in the following manner. Onto the surface of a 12 mil thick sheet (12 × 12-in.) of rubber (MRS) is laid the treated cords at the rate of 18 per inch which are then covered with a second sheet (12 × 12 in.) of 12 mil gauge rubber (MRS). This "sandwich" arrangement of rubber cord and rubber is then doubled onto itself with a piece of Holland cloth extending 1 inch into the doubled assembly from the open end from which assembly is clicked 1 × 3 in. samples, which samples are then cured in a mold at 340° F. for 10 minutes. The cured sample is then placed in an Instron machine, heated at 250° F. and the two strips of rubber separated by the Holland cloth are then moved in opposite directions at the rate of 2 in. per minute to determine the average force (A) required to separate the remaining portion of the sample. Depending on the adhesion developed between the cord and rubber, separation either occurs at the rubber/rubber interface or the rubber/cord interface or at both in varying amounts. After separation has been completed, the amount of rubber remaining (B) on the cord is determined by visual inspection.

2. Compound aging is determined by placing a 16 in. length of cord between two 1 × 10 × 36 in. mil strips of rubber (MRS) and the assembly vulcanized for 10 minutes at 310° F. and then aged for 2½ hours at 350° F. The resulting test sample is placed in an Instron machine and the tensile strength of the cord is measured at room temperature.

Sample 1 in table I is the control wherein no stabilizer was employed. An improvement of up to 130 percent is obtained in using the stabilizer as shown in samples 2 through 6.

EXAMPLE 2

(Stabilizer added to polyisocyanate)

The procedure set forth in example 1 was repeated here except that the stabilizer was added to the polyisocyanate (PAPI) prior to reaction of the polyisocyanate with the blocking resin (resin A) and the stabilizer was a polycarbodiimide and bis(tri-n-butyltin) oxide. These stabilizers are added to the polyisocyanate because they are more compatible with polyisocyanate than in the blocking resin. The results are shown in table II as follows:

TABLE II

| Sample | 1 | 2 | 3 | 4 |
|---|---|---|---|---|
| Polycarbodiimide (3) | — | 1.05 | 1.105 | 1.40 |
| Bis(tri-n-butyltin) oxide | — | — | — | 0.14 |
| Cure (20' at 290° F.) | | | | |
| Force Rating | 100 | 111 | 105 | 103 |
| Rubber Coverage Rating | 100 | 200 | 250 | 200 |
| Cure (10' at 340° F.) | | | | |
| Force Rating | 100 | 109 | 100 | 125 |
| Rubber Coverage Rating | 100 | 100 | 210 | 420 |

(3) The polycarbodiimide has the general formula

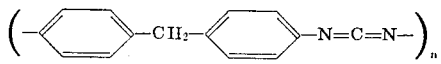

wherein n is about 4.

The following example discloses a two-dip system wherein the stabilizer is added to the first adhesive dip comprising a polyepoxide resin in the manner shown in example 1 of Cardina U.S. Pat. No. 3,247,043 followed by a second adhesive dip of the conventional R/F/L type.

EXAMPLE 3

Varying amounts of stabilizer were added to a 7 percent water solution of a polyepoxide of the type specified in the table below. The cord is passed through the first dip at a rate sufficient to pick up about 2 percent solids and then dried for 1 minute at 450° F. The treated cord is then passed through a second dip comprising the R/F/L adhesive composition shown in example 1 at a rate sufficient to pick up 2 percent solids and then dried for 1 minute at 450° F. The treated cord is then tested for compound aging in the same manner described in example 1. The following table shows the results obtained with the above stabilizers in combination with the two-dip adhesive system.

TABLE III

| Sample | 1 | 2 | 3 | 4 |
|---|---|---|---|---|
| Epoxy Resin (1) | | | | |
| (A) Glycerol | 100 | 98.5 | 95 | 0 |
| (B) Pentaerythritol | 0 | 0 | 0 | 98.5 |
| Stabilizer (MAPO) (2) | 0 | 1.5 | 5 | 1.5 |
| Compound | | | | |
| Aging (Rating) | 100 (control) | 117 | 117 | 113 |

1(A) Epoxy resin (from epichlorohydrin and glycerol) having an epoxide equivalent weight of 147 (0.68 equivalence/100 g.) and being soluble in water.
1(B) Epoxy resin (from epichlorohydrin and pentaerythritol) having an epoxide equivalent weight of 115 (0.87 equivalence/100 g.) and being soluble in water.
2 MAPO tris [1-(2-methyl) aziridinyl] phosphine oxide.

Any of the well-known epoxy resins soluble or dispersible in water may be used as a first dip either alone or in combination with the resorcinol/formaldehyde/rubber latex in the first dip. When used alone in the first dip, then it is desirable to use a second dip containing R/F/L. A specific polyepoxide that may be used, and as described above, is made by reacting 3 mols of glycerol with 9 mols of an epichlorohydrin in the presence of 10 parts of diethylether solution containing about 4.5 percent of boron trifluoride at between 50° C. to about 75° C. for 3 hours. The resulting polyglycidyl ether has a molecular weight of about 124 and an epoxy value of 0.671 equivalence per 100 grams of resin. Other epoxy resins useful in the first dip are those made soluble or dispersable in water and disclosed in Schroeder U.S. Pat. No. 2,902,398 and made by reacting epichlorohydrin with pentaerythritol or with bisphenol A.

The solids of epoxy resins in the first dip may range from about 0.5 to 10 percent and preferably from about 3 to 7 percent. The total amount of solids deposited on the cord surface when passed through a dip tank containing the first adhesive composition may range from about 0.1 percent to about 2 percent by weight of the cord.

The total solids of the resorcinol/formaldehyde/rubber latex reaction product in the second dip may range from about 6 percent to about 30 percent and preferably from about 15 percent to about 22 percent. The amount of resorcinol/formaldehyde/rubber latex reaction product solids picked up on the surface of the cord when passed through a dip tank containing the second adhesive composition may range from about 1 percent to about 5 percent.

The present invention may be used in the manufacture of a pneumatic tire of conventional present day design as shown, for example, in such U.S. Pat. Nos. as 3,157,218; 3,160,191; 3,160,192; 3,217,778; 3,225,810; 3,225,812; 3,244,215; 3,253,633 and 3,253,638 all of which show a vulcanized rubberized fabric carcass of generally toroidal shape having a tread portion superimposed and bonded to the crown area of the carcass and plies of rubberized fabric forming sidewalls extending from the tread over the carcass to the bead portion.

While certain representative embodiments and details have been shown for the purpose of illustrating the invention, it will be apparent to those skilled in this art that various changes and modifications may be made therein without departing from the spirit or scope of the invention.

What is claimed is:

1. In a heat stable structure comprising a polyester cord bonded to rubber with an adhesive composition deposited on the cord prior to imbedment in the rubber, wherein the improvement comprises providing in the vicinity of the adhesive bond a stabilizing amount of at least one heat stabilizing agent selected from the group consisting of a tris substituted-aziridinyl phosphine oxide, a tris substituted-aziridinyl phosphine sulfide, a polycarbodiimide, butyltin) oxide and a hindered phenol having the general formula

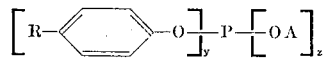

wherein R is a hydrocarbon radical containing from four to 10 carbon atoms, P is phosphorus, and y and z are integers 1 or 2 and the sum of y and z equals 3 and A is selected from the group consisting of

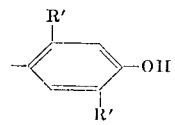

and

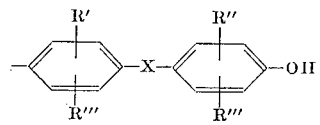

wherein R' and R'' are the same or different tertiary alkyl radicals containing from four to eight carbon atoms, R''' is hydrogen or alkyl radicals containing from two to 10 carbon atoms and X is a saturated aliphatic divalent radical containing from one to four carbon atoms.

2. In the method of making a heat stable cord to rubber structure wherein an adhesive composition is deposited on a polyester cord as a means of providing a bond between the cord and the rubber, the improvement comprising depositing in the vicinity of the adhesive a stabilizing amount of at least one heat stabilizing agent selected from the group consisting of a tris substituted-aziridinyl phosphine oxide, a tris substituted-aziridinyl phosphine sulfide, a polycarbodiimide, bis(tri-n-butyltin) oxide and a hindered phenol having the general formula:

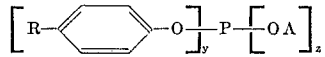

wherein R is a hydrocarbon radical containing from four to 10 carbon atoms, P is phosphorus, and y and z are integers 1 or 2 and the sum of y and z equals 3 and A is selected from the group consisting of

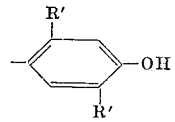

and

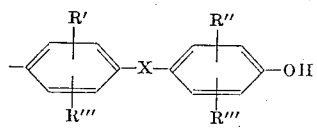

wherein R' and R" are the same or different tertiary alkyl radicals containing from four to eight carbon atoms, R'" is hydrogen or alkyl radicals containing from two to 10 carbon atoms and X is a saturated aliphatic divalent radical containing from one to four carbon atoms.

3. The method of claim 2 wherein the adhesive composition is applied to the cord in two separate dips, the first dip containing a water soluble or dispersable epoxy resin and the second dip containing a rubber latex and a phenol/formaldehyde resin, the stabilizer being in one of the dips.

4. The method of claim 3 wherein the epoxy resin is formed from the reaction of epichlorohydrin and a material selected from the group consisting of glycerin, pentaerythritol, and bisphenol A.

5. The method of claim 4 wherein the stabilizer is tris [1-(2-methyl) aziridinyl] phosphine oxide.

6. The method of claim 4 wherein the stabilizing agent is added to the epoxy resin.

7. The method of claim 6 wherein the stabilizing agent is tris [1-(2] phosphine oxide.

8. The method of claim 2 wherein the adhesive is applied to the cord in two separate dips, the first dip containing a resorcinol/formaldehyde blocked polyisocyanate in combination with a resorcinol/formaldehyde/rubber latex composition and the second dip containing a rubber latex and a phenol/formaldehyde resin.

9. The method of claim 8 wherein the stabilizer is added to the resorcinol/formaldehyde resin prior to its use in making the blocked polyisocyanate.

10. The method of claim 9 wherein the stabilizer is a hindered phenol having the general formula

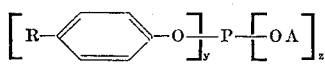

wherein R is a hydrocarbon radical containing from four to 10 carbon atoms, P is phosphorus, and y and z are integers 1 or 2 and the sum of y and z equals 3 and A is selected from the group consisting of

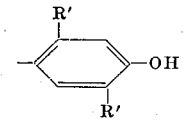

and

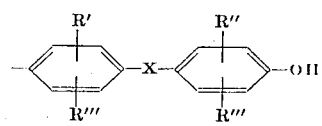

wherein R' and R" are the same or different tertiary alkyl radicals containing from four to eight carbon atoms, R'" is hydrogen or alkyl radicals containing from two to 10 carbon atoms and X is a saturated aliphatic divalent radical containing from one to four carbon atoms.

11. The method of claim 10 wherein the polyisocyanate is polymethylene polyphenyl isocyanate.

12. The method of claim 8 wherein the stabilizer is added to the polyisocyanate prior to its reaction with the resorcinol/formaldehyde resin used in making the blocked polyisocyanate.

13. The method of claim 12 wherein the stabilizer is selected from at least one of the group consisting of the polycarbodiimide having the general formula

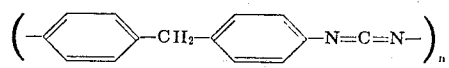

wherein n is about 4 and bis(tri-n-butyltin) oxide.

* * * * *

PO-1050
(5/69)

UNITED STATES PATENT OFFICE
CERTIFICATE OF CORRECTION

Patent No. 3,661,623                     Dated May 9, 1972

Inventor(s) Roop S. Bhakuni; John G. Morgan; Terry F. Allen

It is certified that error appears in the above-identified patent and that said Letters Patent are hereby corrected as shown below:

Column 1, line 43, "100" should read -- 10C --.

Column 6, Claim 1, line 20, "butyltin)oxide" should read -- bis(tri-n-butyltin)oxide --.

Column 7, Claim 7, "tris[1-(2]phosphine oxide" should read -- tris[1-(2-methyl)aziridinyl]phosphine oxide --.

Signed and sealed this 26th day of September 1972.

(SEAL)
Attest:

EDWARD M. FLETCHER, JR.
Attesting Officer

ROBERT GOTTSCHALK
Commissioner of Patents